May 20, 1930.  F. A. KOLSTER  1,759,119
RADIO COMPASS
Filed Feb. 18, 1925

INVENTOR.
Frederick A. Kolster
BY
Cornelius D. Ehret
his ATTORNEY.

Patented May 20, 1930

1,759,119

UNITED STATES PATENT OFFICE

FREDERICK A. KOLSTER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

RADIOCOMPASS

Application filed February 18, 1925. Serial No. 9,936.

My invention relates to radio compasses or kindred receiving apparatus having a directional characterstic and utilizable for interference prevention, and particularly for determining the bearing and sense of direction of a radio beacon or other radio transmitter.

In one of its aspects my invention resides in improvements upon the method and apparatus described and claimed in Letters Patent of the United States No. 1,447,165, granted me on February 27, 1923.

In accordance with my invention, there is utilized in association with a closed circuit, including structure having a non-uniform directional characteristic, an open or antenna path having substantially uniform directional characteristic, with means for effecting electrical symmetry with respect to the closed circuit, but in this case without need for tuning or without means for tuning the open or antenna path for determining the sense of direction of the radio beacon or transmitting station. Instead, there is provided an auxiliary antenna or equivalent absorption structure, preferably of substantially uniform directional characteristic, with switching mechanism or equivalent means for bringing it into such relation with the receiving system as to make possible a determination of the sense of direction of the radio beacon or radio transmitter.

Further in accordance with my invention, the signal-translating apparatus, such as a vacuum tube or tubes, or equivalent, is coupled to the closed circuit by means of a transformer whose primary is not in the strict sense connected in series in the closed circuit, but is connected in parallel with the condenser or rotatable absorption coil of the closed circuit, whereby nicety of balance is obtainable without complication.

My invention resides in the method and apparatus of the character hereinafter described and claimed.

For an understanding of my method, and for an illustration of one of the various forms my apparatus may take, reference is made to the accompanying drawing, in which.

Figure 1:
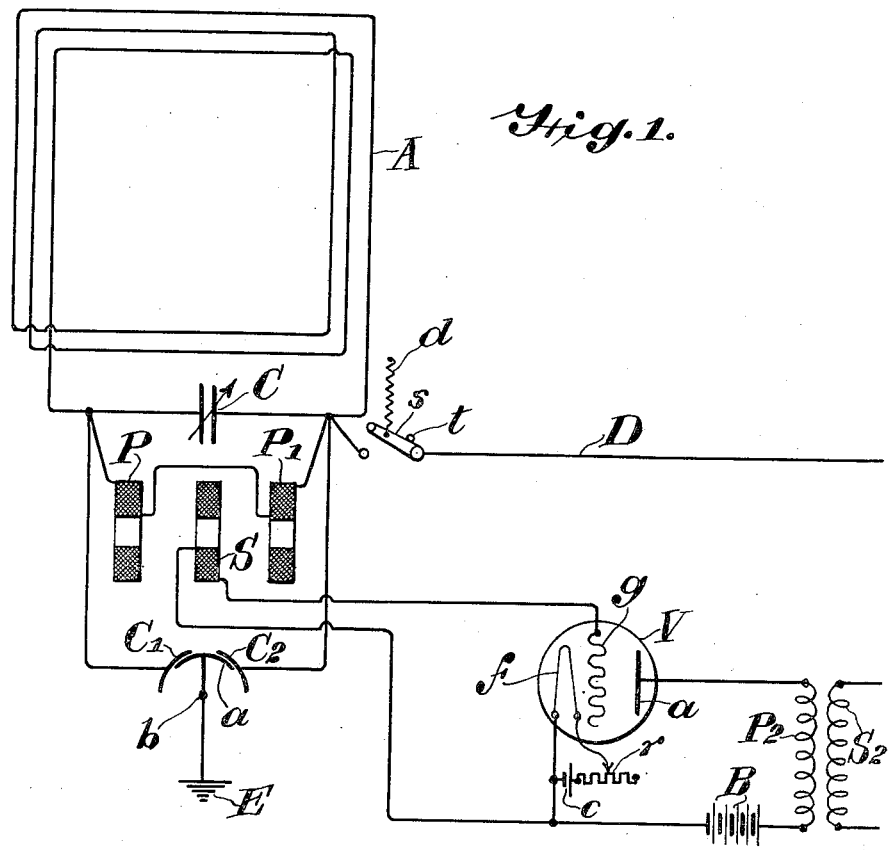
Fig. 1 is a diagrammatic view of a system in accordance with my invention.

Referring to Fig. 1, A is a coil of relatively small dimensions, as, for example, a small fraction of the wave length of the received energy, and constituting a lumped inductance absorbing electro-radiant energy directly from the natural media, with non-uniform directional effect; it may comprise a single turn, or, as indicated, and preferably, a plurality of turns, suitably spaced from each other to minimize its distributed capacity and yet to have a large capacity with respect to earth or other capacity E. The coil A is included in a closed circuit with the adjustable tuning condenser C. The distributed inductance and distributed capacity of the closed circuit are preferably substantially nil. In shunt to the condenser C are the complementarily adjustable condensers $C^1$ and $C^2$, having the common rotatable or adjustable armature or plate $a$ connected to earth or counterpoise E. By rotation of the plate $a$ about its axis $b$ the magnitudes of the capacities $C^1$ and $C^2$ are complementarily varied for determining the degree of symmetry of the open or antenna path with respect to the closed circuit A, C, or for effecting nice or exact symmetry of the closed circuit with respect to the open path or antenna having substantially uniform directional characteristic. In shunt with the coil A, or condenser C, or both, but not directly in series with the coil A and C, is the primary of a coupling transformer, preferably divided into similar serially connected halves P, P¹. The transformer secondary is a coil S disposed between the primary coils P and P¹, and preferably at such distance therefrom that the electrostatic capacities between the coil S and the coils P and P¹ are of such magnitude and so related as to maintain capacitative balance of the system. The ratio of transformation of the transformer may be anything suitable or desirable, and the coupling between primary and secondary is preferably fairly close or tight. The outer terminal of the coil S is preferably connected to the grid $g$ of a thermionic vacuum tube V, as of the audion type, comprising in addition the anode $a$ and the hot cathode or filament $f$ heated as usual by current from the source or battery $c$ through the rheostat or adjustable resistance $r$. The inner terminal of the coil S is connected to the cathode $f$. By the coupling described, the input or grid circuit of the tube V is insulated from or conductively independent of both the closed circuit and the open or antenna path, and yet the symmetry of the system is with nicety maintainable because the transformer primary is connected in shunt to the condenser C or coil A, or both.

The tube V represents generically any signal-translating device, and particularly represents generically either a detector tube or a first radio frequency amplifier tube. In other words, the signal-translating apparatus may comprise one or more stages of radio frequency amplification followed by a detector, which may be followed by one or more stages of audio frequency amplification. Or the tube V may itself represent a detector, followed by one or more stages of audio frequency amplification. In general, in the anode circuit is the battery or source of current B and the primary P² of a transformer which is a radio frequency transformer in case the tube V is a radio frequency amplifier, and which is an audio frequency transformer either when the tube V is a detector or an audio frequency amplifier. The signal-translating instrument is a telephone or equivalent controlled through the last named transformer whose secondary is indicated at S².

Figure 3:
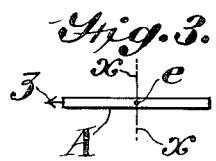
Fig. 3 is a top plan view of a rotatable coil provided with indicators for bearing and sense of direction.

The closed circuit and open antenna path as thus far described will be understood to be in a general way similar to that indicated in Fig. 3 of my aforesaid patent, with the exception, however, that the inductance L or means for tuning the open antenna path have been omitted.

When the apparatus is in the hands of a skilled operator or navigator, the use of the aforesaid tuning inductance L of said patent is preferably retained. But for use by less skilled operators or navigators who may readily learn to tune the closed circuit by adjusting the condenser C, but who do not readily learn to effect the additional tuning of the open or antenna path, as by adjusting the inductance L or tuning element of the aforesaid patent, the tuning or means for tuning the open or antenna path are omitted, as indicated in Fig. 1 hereof, and there is utilized, for determining the sense of direction of the radio beacon or radio transmitter, the auxiliary antenna or equivalent absorption structure D, which may have substantially uniform directional characteristic, and which may be of any suitable character, such, for example, as an insulated conductor lying upon the deck of a ship or otherwise suitably disposed adjacent the receiving system. The auxiliary absorption structure D is normally out of electrical communication with the receiving system, because the switch $s$ is normally held open against the stop $t$ by the spring $d$. By closing the switch $s$, however, the structure D is brought into electrical communication with the receiving system, and particularly with one terminal of the condenser C or coil A of the closed circuit, in which case the symmetry or degree of symmetry of the closed circuit with respect to the open or antenna path is changed, and besides, the energy absorbed by the structure D affects the receiving system in a manner to assist in determining the sense of direction of a radio beacon or radio transmitter.

Figure 2:
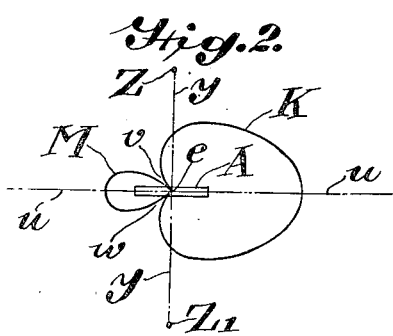
Fig. 2 is a graphic representation of magnitudes of received or absorbed energy with respect to direction.

When the closed circuit is to suitable degree unbalanced or unsymmetrical with respect to the antenna path, the reception is uni-lateral, and th intensities with respect to directions correspond with a cardioid, such, for example, as indicated in Fig. 2 of the aforesaid patent. However, when the switch $s$ is closed, the uni-lateral characteristic is modified and is not strictly uni-lateral, and the intensities of received energy with respect to directions are of the character indicated in Fig. 2, comprising, for example, substantially a cardioid K and a loop M, with indentations $v$ and $w$. Within the indentations $v$ and $w$ there is substantially no energy absorbed or received, and there are accordingly two positions of the coil A for zero or minimum energy reception or absorption.

The operation is as follows:

With the closed circuit balanced or substantially perfectly symmetrical with respect to the open or antenna path, as effected by complementary adjustment of the condencers C¹ and C², as described in the patent aforesaid, the coil A is rotated about its axis $e$, generally vertical, to such position as to indicate the bearing of the radio beacon or radio transmitter, without, however, determining the sense of direction thereof; that is, determining the plane, generally vertical, passing through the receiving station or apparatus and the distant beacon or transmitting apparatus, without determining whether the beacon or transmitting apparatus be on one side or the other of the receiving apparatus. The position of the coil A for so determining the bearing of the distant source with nicety may be such that its plane is normal to the line of bearing, as determined by zero or minimum response in the signal-translating instrument controlled through or by the tube V. That is, as indicated in Fig. 3, the bearing pointer $x$ extends or points in a direction normal to the plane of the coil A, and may be the indicator or pointer which cooperates with a compass card or the like.

Referring to Fig. 2, $y$ represents the plane in which the distant source is located, but the position of that source to the one side or the other of the plane $u$ of the coil is as yet unknown.

This position is ascertained by closing the switch $s$ with the coil A in its last mentioned position, such, for example, as normal to the direction of the distant source. The effect of closure of the switch $s$ is to render the closed circuit to some extent unsymmetrical and, in addition, to apply to it the open antenna path D (an additional amount of absorbed or received energy, producing the conditions illustrated in Fig. 2), in which there is minimum or zero reception in two directions.

With the switch still held closed by the observer, he rotates the coil A to the two positions of maximum response indicated by the curves K and M. The sound in the signal-translating instrument or telephone for one of these positions will be much greater than for the other and will be readily or easily distinguishable, and thereby the operator can determine that the beacon or radio transmitter lies on a certain side of the plane or line $u$, for example, at Z, on the line or in the plane $y$. For this purpose, the coil may carry a pointer or indicator $z$, Fig. 3, which may be placed upon that vertical side of the coil A which will, under the circumstances described, point at the beacon or station Z when the coil is rotated approximately 90 degrees in counter-clockwise direction from its position indicated in Fig. 2.

Or, with the coil A normal to the direction of propagation, as indicated in Fig. 2, when the closed circuit is symmetrical with respect to the antenna path, the switch $s$ is closed, causing the unbalance and absorption of energy above described. With the switch $s$ remaining closed, the operator rotates the coil A, say, in clockwise direction from the position indicated in Fig. 2 until the angle $v$ embraces the plane $y$, in which there is small or zero response, from which the operator will determine that the beacon or transmitter is, say, at Z. Or if by rotation of the coil A in opposite direction to bring the angle $w$ to position to embrace the previously determined plane $y$, the minimum or zero response will indicate that the sense of direction of the beacon or transmitting station is that on the lower side of the plane $u$ of the coil, as, for example, at $Z^1$.

Therefore, for either of the above modes of operation, the auxiliary absorbing structure D is serviceable for determining in general sense of direction after or before the line or plane of bearing has been accurately determined.

The bearing having been determined, and the sense of direction also, the operator releases the switch $s$, which is then opened and held open by the spring $d$, and the apparatus is again in condition for making a new observation or determination, either of the same or some other beacon or transmitting source.

By the method described, when the absorption structure D is connected to the system, the sense of direction is determinable either by observing the relative magnitudes of responses or, since there are two directions $v$ and $w$ of minimum or zero absorption or reception, the sense of direction may be determined by rotating the coil A in the one direction or the other for zero or minimum response, and the sense of direction of rotation of the coil determines the sense of direction or bearing of the source.

What I claim is:

1. The method of determining the sense of direction of a source of electro-radiant energy by means of a closed circuit including non-uniform directional absorbing structure, a path having substantially uniform directional characteristic and between which and said closed circuit a predetermined degree of symmetry exists, and auxiliary absorption structure, which comprises bringing said auxiliary absorption structure into such relation with respect to said closed circuit as to apply thereto additionally absorbed energy and to change the degree of symmetry of said closed circuit with respect to said path, utilizing the resultant energy to produce an indication, and rotating said non-uniform directional absorption structure to vary said indication and thereby determine the sense of direction of said source.

2. The method of determining the bearing and sense of direction of a source of electro-radiant energy by means of a closed circuit including non-uniform directional absorption structure, a path having substantially uniform directional characteristic and between which and said closed circuit a predetermined degree of symmetry exists, and auxiliary absorption structure, which comprises rotating said non-uniform directional absorption structure to position determining the bearing of said source, thereafter bringing said auxiliary absorption structure into such relation with respect to said closed circuit as to apply thereto additionally absorbed energy and to change the degree of symmetry of said closed circuit with respect to said path, utilizing the resultant energy to produce an indication, and rotating said non-uniform directional absorption structure to vary said indication and thereby determine the sense of direction of said source.

3. The method of determining the sense of direction of a source of electro-radiant energy by means of a closed circuit including non-uniform directional absorption structure, a path having substantially uniform directional characteristic and between which and said closed circuit symmetry exists, and auxiliary absorption structure, which comprises tuning said closed circuit to the energy from said source, leaving said path untuned with respect to the energy from said source, bringing said auxiliary absorption structure into such relation with respect to said closed circuit as to apply thereto additionally absorbed energy and to render said closed circuit unsymmetrical with respect to said path, utilizing the resultant energy to produce an indication, and rotating said non-uniform directional absorption structure to vary said indication and thereby determine the sense of direction of said source.

4. The method of determining the bearing and sense of direction of a source of electro-radiant energy by means of a closed circuit including non-uniform directional absorption structure, a path having substantially uniform directional characteristic and between which and said closed circuit symmetry exists, and auxiliary absorption structure, which comprises tuning said closed circuit to the energy from said source, leaving said path untuned with respect to the energy from said source, rotating said non-uniform directional absorption structure to position determining the bearing of said source, thereafter bringing said auxiliary absorption structure into such relation with respect to said closed circuit as to apply thereto additionally absorbed energy and to render said closed circuit unsymmetrical with respect to said path, utilizing the resultant energy to produce an indication, and rotating said non-uniform directional absorption structure to vary said indication and thereby determine the sense of direction of said source.

5. Radio receiving apparatus comprising non-uniform directional absorption structure, substantially uniform directional absorption structure co-acting therewith, means for translating the received energy into an indication, auxiliary absorption structure, and means for bringing said auxiliary absorption structure into electrically unsymmetrical relation with said first named absorption structure for determining the sense of direction of a source of electro-radiant energy.

6. Radio receiving apparatus comprising a closed circuit including non-uniform directional absorption structure, absorption structure having substantially uniform directional characteristic, means for determining the degree of symmetry of said closed circuit with respect to said second named absorption structure, means for translating energy in said closed circuit into an indication, auxiliary absorption structure, and switching mechanism for connecting said auxiliary absorption structure with said absorption structures at such point as to apply thereto additionally absorbed energy and to change the degree of symmetry of said closed circuit with respect to said second named absorption structure.

7. Radio receiving apparatus comprising a closed circuit including a rotatable coil, an antenna path, means for establishing symmetry between said closed circuit and said path, signal-translating means associated with said closed circuit and path, auxiliary absorption structure, and means for bringing said auxiliary absorption structure into electrically unsymmetrical relation with said closed circuit for determining the sense of direction of a source of electro-radiant energy.

8. Radio receiving apparatus comprising a closed circuit including a rotatable coil, a substantially aperiodic antenna path, means for tuning said closed circuit, means for effecting symmetry between said closed circuit and said path, signal-translating means associated with said closed circuit and antenna path, auxiliary absorption structure, and switching means for bringing said auxiliary absorption structure into connection with said closed circuit at a point thereof unsymmetrical with respect to said path for changing said symmetry and for determining the sense of direction of a source of radiations.

9. Radio receiving apparatus comprising a closed circuit including non-uniform directional absorption structure, absorption structure having a different directional characteristic, means for effecting symmetrical coupling between said absorption structures, means for translating received energy, auxiliary absorption structure, and means for bringing said auxiliary absorption structure into such relation with said absorption structures as to destroy the symmetry of said coupling for determining the sense of direction of a source of electro-radiant energy without varying the symmetry of said coupling itself.

10. Radio receiving apparatus comprising a closed circuit including non-uniform directional absorption structure, absorption structure having a different directional characteristic, means for effecting symmetrical coupling between said absorption structures, means for translating received energy, auxiliary absorption structure, and means for bringing said auxiliary absorption structure into such relation with said absorption structures as to destroy the symmetry of said coupling, whereby the sense of direction of a source of electro-radiant energy may be determined without tuning said second named absorption structure to said energy.

In testimony whereof I have hereunto affixed my signature this 5th day of February, 1925.

FREDERICK A. KOLSTER.